United States Patent
Shimomura et al.

(10) Patent No.: US 7,566,758 B2
(45) Date of Patent: Jul. 28, 2009

(54) EPOXY RESIN COMPOSITION

(75) Inventors: Akihiko Shimomura, Kanagawa (JP); Hiromichi Noguchi, Tokyo (JP); Isao Imamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 11/290,539

(22) Filed: Dec. 1, 2005

(65) Prior Publication Data

US 2006/0089466 A1   Apr. 27, 2006

Related U.S. Application Data

(62) Division of application No. 10/341,373, filed on Jan. 14, 2003, now Pat. No. 7,074,273.

(30) Foreign Application Priority Data

Jan. 17, 2002   (JP)   ............... 2002-008441

(51) Int. Cl.
*C08L 63/00*   (2006.01)

(52) U.S. Cl. .............. 525/525; 525/116; 522/111; 522/112; 118/302

(58) Field of Classification Search ................ 525/525, 525/116; 118/302; 522/112, 111
See application file for complete search history.

(56) References Cited

U.S. PATENT DOCUMENTS

| | | | |
|---|---|---|---|
| 4,954,580 A | | 9/1990 | Zahir .......................... 525/476 |
| 5,998,073 A | * | 12/1999 | Kuramoto et al. ......... 430/109.2 |
| 6,030,739 A | * | 2/2000 | Ishikawa et al. .......... 430/108.3 |
| 6,126,922 A | * | 10/2000 | Rozzi et al. .................... 424/49 |
| 6,260,949 B1 | | 7/2001 | Smith et al. .................... 347/44 |
| 6,416,917 B1 | * | 7/2002 | Nakanishi et al. ......... 430/109.2 |
| 6,750,290 B2 | | 6/2004 | Imamura et al. ............ 525/116 |
| 2002/0155366 A1 | * | 10/2002 | Mochizuki et al. ....... 430/109.2 |
| 2003/0169313 A1 | | 9/2003 | Shimomura et al. ........... 347/45 |

FOREIGN PATENT DOCUMENTS

EP   0 271 873 A2   6/1988

(Continued)

OTHER PUBLICATIONS

J.C. van de Grampel et al., "New Polysiloxanes for Chemically Amplified Resist Applications," 614 *Am. Chem. Soc., ACS Symposium Series (Microelectronics Technology)*, pp. 333-354 (1995) (Abstract).

*Primary Examiner*—Mark Eashoo
*Assistant Examiner*—Megan McCulley
(74) *Attorney, Agent, or Firm*—Fitzpatrick, Cella, Harper & Scinto (57) ABSTRACT

An embodiment of the invention relates to a novel epoxy resin composition. The epoxy resin composition comprises (i) a first epoxy resin having in the molecule thereof at least one water-repellency-imparting group and two or more cyclic aliphatic epoxy groups, and having a number average molecular weight ranging from 8,000 to 22,000 and a polydispersity ranging from 3.5 to 5.0, (ii) a second epoxy resin having in the molecule thereof at least one water-repellency-imparting group and two or more cyclic aliphatic epoxy groups, having a number average molecular weight ranging from 2,500 to 8,000 and a polydispersity ranging from 1.5 to 3.0, and (iii) a cationic polymerization catalyst.

2 Claims, 3 Drawing Sheets

FOREIGN PATENT DOCUMENTS

| | | |
|---|---|---|
| EP | 0 319 472 A2 | 6/1989 |
| EP | 0 368 320 A2 | 5/1990 |
| EP | 0 739 945 A2 | 10/1996 |
| EP | 0 779 337 A1 | 6/1997 |
| EP | 0 942 024 A2 | 9/1999 |
| EP | 1 085 031 A2 | 3/2001 |
| JP | 61-252230 | 11/1986 |
| JP | 2-39944 | 2/1990 |
| WO | WO 0060418 A1 * | 10/2000 |

* cited by examiner

EPOXY RESIN COMPOSITION

This application is a division of application Ser. No. 10/341,373, filed Jan. 14, 2003, which is incorporated herein by reference.

BACKGROUND OF THE INVENTION

1. Field of the Invention

The present invention relates to a curable epoxy resin composition useful for surface treatment to impart water-repellency or ink-repellency to an article surface, especially to an epoxy resin composition for forming a coated film (coating) in a pattern by UV irradiation. The present invention also relates to a surface treatment method employing the epoxy resin composition; a liquid ejection recording head having been treated for ink repellency with the resin composition, and a liquid ejection recording apparatus employing the liquid ejection recording head.

2. Related Background Art

Generally, in many application fields, methods are known for providing a member with water-resistant or ink-repellent properties by applying a water-repellent paint, and resin materials and paints for the methods have been developed. For example, the coating formed from a fluorine-type paint having a fluoropolyolefin group or a perfluoro group is sufficiently stable thermally and chemically, and it has excellent weather resistance, water resistance, chemical resistance, solvent resistance, and the like properties. Such coating has high mold releasability, abrasion resistance, and water repellency, and is used in various application fields.

On the other hand, liquid ejection recording heads, which eject liquid droplets through an ejection orifice onto a paper sheet or a like recording medium to conduct recording or to form an image, are being improved for higher recording performance with a smaller liquid droplet size, a higher driving frequency, and a larger number of nozzles. Therefore, the treatment to keep the surface condition of the nozzles unchanged is becoming more important.

However, it is difficult to conduct a surface treatment selectively or in a precise pattern to prevent ink from adhering to the nozzle surface due to the following reasons. For the above-mentioned fluorine-type paint to function like a photoresist, the paint should be mainly composed of a substance having a photosensitive functional group. However, such a molecule cannot readily be designed to also be water-repellent or ink-repellent.

Furthermore, even if the surface treatment can be made satisfactory by the use of a conventional fluorine-type material, the coating structure should be designed to maintain the surface properties for a long period of time. The surface treatment material yielding the above properties in a pattern is highly useful in treatment of the surface of a liquid ejection recording head (ink-jet printing head), as is explained below.

For the ink-jet recording system to conduct a recording by ejection of ink droplets, the ejection orifice (opening) is preferably designed to have the following performance:

1. The ink column of remaining unejected droplets can be quickly put back into the nozzle.
2. The ink droplets adhering to the surface can readily be swept out by a cleaning operation.
3. The ink droplets adhering to the surface should be resistant to scratching in a cleaning operation and paper sheet delivery.
4. In repeated liquid droplet formation and ink-refilling, a meniscus should be formed at the position of the nozzle face ("23" in FIG. 1).
5. The normal line of the meniscus should be directed to the droplet ejection direction.
6. The interfacial tension or the contact angle should be sufficient even for an ink having a low surface tension, or even under low negative pressure conditions.

In the liquid ejection recording head, the ejection orifice should have the above properties, because the recording liquid, such as ink, adhering to the periphery of the orifice will cause a deviation in the direction of the ejection (flight) of the liquid droplets to render the printing imprecise and will directly impair the printing performance. Methods of water-repellency treatment of the ejection orifice face are known to prevent the adhesion of liquid at or around the ejection orifice, so as not to cause a deviation of the ejection direction.

An example of the related prior art techniques is an ink-repellency treatment with a polymer having a fluoroacetyl group and a silazane group (e.g., Japanese Patent Application Laid-Open No. 2-39944, etc.). On the other hand, with greater needs for image recording by a printer of the liquid ejection recording system, the properties of the recording liquid are required to be further improved. Since, such a recording liquid is usually formulated to be basic (pH 7-11) for higher dissolution stability or higher dispersion stability of the contents, the members of the printer are preferably made from a construction material having high alkali resistance and high hydrolysis resistance.

SUMMARY OF THE INVENTION

As mentioned above, in the case where the recording liquid contains a polar organic solvent or has a high pH value, when a water-repellency imparting agent applied to conduct surface treatment of the ejection orifice face for the above-described purposes comes into contact with a solvent component used in the recording liquid, especially a polar organic solvent component, the formability of the resulting water-repellent coating or its adhesion with the coated member is often impaired, so that the water-repellent coating peels off to cause a loss in water repellency of the ejection orifice face.

An object of the present invention is to provide an epoxy resin composition, which is suitable for a water-repellency imparting agent or a water-repellent paint to be used at the portion where a solution or a material containing the component, which will impair the coating formability or coating adhesiveness of the water repellent coating, like a polar solvent.

Another object of the present invention is to provide an epoxy resin composition, which is capable of a surface modification treatment to keep the surface condition unchanged.

Still another object of the present invention is to provide a surface treatment method for imparting water repellency on a surface of an article with positional selectivity.

A further object of the present invention is to provide a liquid ejection recording head in which the surface of a base material thereof is treated with the aforementioned epoxy resin composition to keep the nozzle surface condition unchanged and to prevent ink from adhering to the print head surface even after a long-term contact with a recording medium, to achieve a high impact precision with respect to dots, to maintain a high printing quality for a long period of time, and also to provide a liquid ejection recording apparatus employing the liquid ejection recording head.

The above objects are attained according to the present invention.

In an embodiment of the present invention, the epoxy resin composition comprises:

(i) a first epoxy resin having in the molecule thereof at least one water-repellency-imparting group and two or more cyclic aliphatic epoxy groups, and having a number average molecular weight ranging from 8,000 to 22,000 and a polydispersity ranging from 3.5 to 5.0;

(ii) a second epoxy resin having in the molecule thereof at least one water-repellency-imparting group and two or more cyclic aliphatic epoxy groups, and having a number average molecular weight ranging from 2,500 to 8,000 and a polydispersity ranging from 1.5 to 3.0; and (iii) a cationic polymerization catalyst.

In another embodiment of the present invention, the surface treatment method comprises the steps of:

(i) forming a coating of the epoxy resin composition on a surface of an article;

(ii) irradiating the coating with an active energy ray with positional selectivity; and (iii) removing the portion of the coating not irradiated with the active energy ray by use of a liquid capable of dissolving the portion of the coating not irradiated by the active energy ray.

In still another embodiment of the present invention, the surface treatment method comprises the steps of:

(i) forming a coating of the epoxy resin composition on a surface of an article;

(ii) polymerizing the coating to cause curing; and (iii) removing the cured coating obtained in step (ii) with positional selectivity.

In a further embodiment of the present invention, the liquid ejection recording head having an ejection orifice for ejecting a liquid is coated at least at the periphery of the ejection orifice with the cured coating of the epoxy resin composition.

In a still further embodiment of the present invention, the liquid ejection recording apparatus has the aforementioned liquid ejection recording head.

The coating (cured product) composed of the epoxy resin composition of the present invention has excellent adhesion to various kinds of materials, is curable even at a relatively low temperature, and has satisfactory properties as a construction material. Further, the coating has a remarkably improved resistance to water-soluble organic solvents, especially polar organic solvents owing to incorporation of the epoxy resin having the water-repellency-imparting group. Further incorporation of a compatibilizer gives compatibility between the components in the resin composition to broaden the range of the material constitution of the resin composition of the present invention.

The coating formed by applying and drying the epoxy resin composition of the present invention, which contains an onium salt of a Lewis acid capable of being activated by an active energy ray, can be cured in a pattern. Therefore, a surface of an article can be surface-treated in a pattern by removing the uncured portion of the coating.

The surface treatment in a pattern can be conducted, for example, through the steps of applying an epoxy resin composition on a base material and drying it to form a coating, applying an active energy ray through a mask in a prescribed pattern onto the coating, and conducting a development with a developing liquid to remove the uncured portion of the coating. The process of this patterning treatment is basically similar to photolithography. The developing liquid is selected from a solvent or a solvent composition suitable for the coating composed of the resin composition. The developing liquid is thus selected from aromatic hydrocarbons, ketones, esters, glycol ethers, and the like; and mixtures thereof.

In the surface treatment into a pattern with the epoxy resin composition of the present invention, so-called "postcure" is preferably conducted after the development to complete the curing of the coating composed of the resin composition. The postcure includes heating of the coating or irradiation of the coating with an active energy ray. The epoxy resin composition of the present invention is a combination of a first epoxy resin having a relatively high molecular weight and having a water-repellency imparting group and a second epoxy resin having a relatively low molecular weight and having a water-repellency-imparting group. This combination can provide excellent coating properties and patterning properties (providing a high image resolution and excellent pattern profile) as well as high water repellency.

Therefore, the epoxy resin composition of the present invention is useful as a water repellency imparting agent or a water-repelling paint for application onto portions that may be brought into contact with a solution or a material containing a component like a polar organic solvent, which will impair the effectiveness of the water repellency. This epoxy resin composition is also useful for water- or ink-repellency treatment of the ejection orifice face of the liquid ejection recording head.

The application of the resin composition of the present invention to the ink-jet recording apparatus results in a selective surface modification by utilizing photo-polymerizability, high precision of the treatment, high solid strength of a cured coating, high durability of the device owing to improved friction strength. The high water- or ink-repellency improves the meniscus retainability of aqueous inks, cleanability, precision of liquid droplet ejection direction, stability in continuous ejection, print-starting characteristics after an intermission, and other properties. Herein, the term "meniscus retainability" means the properties of retaining the ink surface by the surface tension at the nozzle tip and restoring and maintaining the meniscus after every repeated liquid droplet ejection to the prescribed position. Lower retainability can cause oozing of the ink from the nozzle tip, decrease of the volume of the ejected ink droplet owing to the backward movement of the meniscus, disruption of the ink ejection in an extreme case, and other disadvantages.

DESCRIPTION OF THE PREFERRED EMBODIMENTS

The present invention is explained below in more detail by reference to preferred embodiments.

The epoxy resin composition of the present invention comprises at least:

(i) a first epoxy resin having in the molecule thereof at least one water-repellency-imparting group and two or more cyclic aliphatic epoxy groups, and having a number average molecular weight ranging from 8,000 to 22,000 and a polydispersity ranging from 3.5 to 5.0;

(ii) a second epoxy resin having in the molecule thereof at least one water-repellency-imparting group and two or more cyclic aliphatic epoxy groups, and having a number average molecular weight ranging from 2,500 to 8,000 and a polydispersity ranging from 1.5 to 3.0; and (iii) a cationic polymerization catalyst.

The aforementioned first epoxy resin, which has a relatively high molecular weight, provides the coating liquid containing the epoxy resin compound of the present invention with satisfactory coating properties with respect to an article to be coated, and improves the workability of the dried coating after solvent evaporation. On the other hand, the second epoxy resin, which has a lower molecular weight, serves as an oligomer to provide excellent patterning properties to the coating constituted of the epoxy resin composition of the present invention. Therefore, when conducting patterning, the coating gives a satisfactory pattern with high resolution and a satisfactory profile. As explained above, the combination of the first epoxy resin serving as a binder and the second epoxy resin serving as an oligomer, both having a water-repellency-imparting group, imparts a sufficient water repellency to the finally obtained cured coating.

In the present invention, the term "polydispersity" signifies Mw/Mn (Mn denotes a number average molecular weight, and Mw denotes a weight average molecular weight).

The first and second epoxy resins of the above epoxy resin composition are not specially limited, provided that the resins satisfy the above conditions. However, the first epoxy resin and the second epoxy resin preferably have as a constituting unit, a monomer unit represented by Structural Formula (a) shown below and at least one monomer unit selected from the group consisting of monomers represented by Structural Formulas (b), (c) or (d) independently of each other:

(a)

In the above Formula (a), $R_1$ denotes a hydrogen atom, or a linear or branched alkyl group of 1-3 carbons; $R_2$ denotes a linear or branched alkylene group of 1-3 carbons; and Z denotes a cyclic aliphatic epoxy group. The cyclic aliphatic epoxy group includes an epoxycycloalkyl group, specifically epoxycyclohexyl groups represented by the structural formula below, epoxycyclopentyl, epoxycyclobutyl, and like groups.

(b)

In the above Formula (b), $R_4$ denotes a hydrogen atom, or a linear or branched alkyl group of 1-3 carbon atoms; $R_5$ and $R_6$ independently denote a group selected from methyl and phenyl; $R_7$-$R_9$ independently denote a hydrogen atom or a linear or branched alkyl group of 1-3 carbons; $n_1$ denotes an integer of 1-5; and x denotes an integer of 2-100.

(c)

In the above Formula (c), $R_{10}$, $R_{11}$, $R_{16}$, and $R_{17}$ independently denote a hydrogen atom, a linear or branched alkyl group of 1-3 carbons, or a nitrile group; $R_{12}$-$R_{15}$ independently denote a hydrogen atom, or a linear or branched alkyl group of 1-3 carbons; $n_2$, $n_3$, $n_5$, and $n_6$ independently denote an integer of 1-5; and $n_4$ denotes an integer of 2-200.

(d)

In the above Formula (d), $R_{18}$ denotes a hydrogen atom, or a linear or branched alkyl group of 1-3 carbons; $n_7$ denotes an integer of 1-5; and Rf denotes a fluoroalkyl group. Rf includes a linear or branched fluoroalkyl group of 6-12 carbons, preferably 8-10 carbons, of which specially preferred are perfluoroalkyl groups.

Specific examples of the first epoxy resin are shown by Structural Formulas (A1-1) and (A1-2); and a specific example of the second epoxy resin is shown by Structural Formula (A2-1).

(A1-1)

wherein a/b=5/3, Mn=14,000, and polydispersity 4.0 wherein a/d=5/3, Mn=15,000, and polydispersity 4.1, wherein a/d=3/1, Mn=4,000.

The first epoxy resin and the second epoxy resin used in the present invention can be obtained by copolymerizing monomers that correspond to the monomer units a-d at a prescribed monomer ratio by a conventional process. For example, an epoxy resin containing the monomer units (a) and (b) can be obtained by copolymerizing a monomer represented by Structural Formula (a-1) below and another monomer represented by Structural Formula (b-1) below.

An epoxy resin containing the above units (a) and (c) can be synthesized by radically polymerizing a monomer represented by Structural Formula (c-1) in the presence of the monomer represented by the above Structural Formula (a-1).

In the above Structural Formula (c-1), $R_{19}$-$R_{22}$ respectively denote the same groups as $R_{10}$, $R_{11}$, $R_{16}$, and $R_{17}$. The compound represented by Formula (c-1) can be synthesized, for example, by the process described in Japanese Patent Publication No. 2-33053 (Japanese Patent Application Laid-Open No. 61-252230); specifically by a reaction of a diamine represented by Formula (c-1-1) below and dihalides represented by Formulas (c-1-2) and (c-1-3) below.

-continued (c-1-3)

An epoxy resin containing the units (a) and (d) can be obtained by copolymerizing a monomer represented by the above Formula (a-1) and another monomer represented by Formula (d-1) below.

(d-1)

The epoxy resin composition of the present invention is mainly composed of the first epoxy resin, the second epoxy resin, and a catalyst, and preferably contains an additional compatibilizer as necessary. The compatibilizer is exemplified by the compounds represented by General Formula (1) below and General Formula (2) below. The epoxy resin composition of the present invention preferably contains at least one of the compatibilizers represented by the General Formulas (1) and (2).

A specific example of the above compound is the compound of q=0, namely m-bis[1-(2,3-epoxypropoxy)-2,2,2-trifluoro-1-(trifluoromethyl)ethyl]benzene.

Although the compounds represented by the above General Formulas (1) and (2) have fluoroalkyl groups, these compounds have short-length chains. Therefore the surface energy of the formed coating is not considerably lowered, so that the water repellency and ink repellency are not high. The compounds represented by the above General Formulas (1) and (2) can be synthesized by the reaction of a dihydric alcohol and epichlorohydrin through a conventional process, the dihydric alcohol corresponding to General Formula (1) or (2), but not having the epoxy-containing terminal group at both ends.

The epoxy resin composition contains a polymerization initiator as a catalyst for curing the composition. The catalyst (curing agent) is selected from substances known as epoxy-resin-curing agents. The epoxy resin composition of the present invention can be cured by heating the coating formed from the composition with an aromatic or aliphatic amine or an acid anhydride. However, in the present invention, the resin composition is so designed as to be highly reactive to an onium salt of a Lewis acid capable of being activated by an (1)

(In the above Formula, p is an integer of 0-2)

A specific example of the above compound is the compound of q=0, namely 2,2-bis(4-glycidyloxyphenyl)-hexafluoropropane.

active energy ray at a lower temperature. Therefore, by use of the resin composition, a surface of a base material can be selectively treated by photolithography. This is suitable for a surface modification, specifically a water-repellency treat- (2)

(In the above Formula, q is an integer of 0-2 and

)

ment, of the surface of an article, which does not have sufficient thermal resistance. The catalyst examples include bis(4-t-butylphenyl)iodonium salt; and "Optomer SP-150", "Optomer SP-170", "Optomer SP-172", "Opton CP-66", and "Opton CP-77" (trade names, Asahi Denka Kogyo K.K.).

Of the above catalysts, "Optomer. SP-150" has the chemical structure shown by the formula below:

Catalyst 1: Optomer SP-150

"Optomer SP-170" has the chemical structure shown by the formula below.

Catalyst 2: Optomer SP-170

Other useful polymerization initiators include "Irgacure 261" (trade name, Ciba Specialty Co.) shown by the structural formula below.

Irgacure 261

The epoxy resin composition of the present invention may further contain an additional epoxy polymer capable of contributing to the cross-linking reaction by itself as a binder polymer in addition to the aforementioned first epoxy resin: the additional epoxy polymer includes acrylic resins produced by copolymerizing acryl monomers having an epoxy group in the side chain, vinyl polymers produced by polymerization of vinyl monomer having a cyclic aliphatic epoxy group in the side chain, polyether polymers having a cyclic aliphatic epoxy group in the side chain (e.g., EHPE 3150 produced by Dicel Chem. Ind.), and so forth. In the case where an additional polymer is used, which polymer has no epoxy group, an additional polymer is selected in consideration of the properties for use of the resulting composition. Such a polymer includes polymer compounds for general-purpose paints, such as polymers of bisphenol-type epoxy resins (e.g., "PKHC" and "PKHJ" (trade name, Union Carbide Co.)), poly(ethylene/vinyl acetate) resins, phenol resins, polycarbonate resins, polyester resins, polyamide resins, and soluble polyimide resins.

The epoxy resin composition of the present invention comprises basically

A1: the first epoxy resin,
A2: the second epoxy resin,
B: the cationic polymerization catalyst, and optionally
C: the compatibilizer.

The preferred blending ratios of the components A, B, and C in the resin composition are shown below.

First, the curing catalyst (B) is used in an amount of 0.5-7 parts by mass based on 100 parts by mass of the entire epoxy resin composition. The blending ratio of the first epoxy resin (A1) to the second epoxy resin (A2) is selected depending on the softening points and glass transition temperatures thereof. Generally, the ratio A1:A2 ranges from 10:90 to 90:10 (mass ratio), but is not limited thereto. Since these compounds may be less compatible and the onium salt of a Lewis acid, which is the catalyst, is highly polar, the compatibilizer C is advantageously used in many cases. The compatibilizer C is preferably used in an amount of 0-80 parts by mass based on 100 parts by mass of the entire epoxy resin.

The epoxy resin composition of the present invention is useful for surface treatment of articles by heating or active energy ray irradiation. Specifically, in the treatment, the resin composition is dissolved in a solvent, such as aromatic hydrocarbons, aliphatic hydrocarbons, esters, ethers, and fluorine-type solvents, and the solution is applied onto a base material surface by a coating/printing method, such as roll coating, spin coating, spray coating, die coating (direct coater), screen printing, and gravure coating. After application onto the base material surface, the formed coating is cured by heating or irradiation of active energy rays. A suitable active energy ray includes UV rays with a line spectrum containing a large quantity of bright lines in the wavelength range of 200 to 480 nm emitted from a mercury lamp, laser beams, and electron beams.

The epoxy resin composition of the present invention preferably contains the aforementioned binder component, and is formulated to be capable of forming a dry solid coating. A surface of an article can readily be treated for water repellency at a prescribed position of the surface by a process similar to photoresist patterning. In this treatment, the coating liquid containing the resin composition of the present invention is applied to an article surface by coating or a like method; the solvent is removed to form a dry coating; the coating is irradiated with an active energy ray through a patterned mask, or irradiated in a pattern; and then a development treatment is carried out with a solvent capable of dissolving the uncured portion of the coating. When the irradiation of the patterned active energy ray is insufficient for complete curing, a postcure treatment is preferably conducted after the development treatment. The postcure is conducted by thermal treatment using heat, microwaves, or the like, or by irradiation of active energy, such as electron beams and UV rays.

The surface modification of the present invention as described above enables treatment for water- and/or oil-repellency with sufficient adhesiveness and good hardness of the coating film to advantageously modify the base material and achieve a high durability. In another method for treating an article surface with positional selectivity, the article surface is coated with a coating formed from the epoxy resin of the present invention; the coating is cured into a cured coating; and then the cured coating is selectively removed by irradiating the cured coating with an excimer laser, or the like.

In an example of utilization of the epoxy resin composition of the present invention for a liquid ejection recording head (ink-jet recording head), a surface of a nozzle of the liquid ejection recording head is treated with the epoxy resin composition of the present invention to modify the surface such that firm adhesion of the ink onto the nozzle surface is prevented and the ink adhering onto the nozzle surface can be wiped off with sufficient releasability by a cleaning treatment.

A cleaning mechanism mounted on the liquid ejection recording apparatus conducts cleaning by wiping the ink with a rubber blade, sucking the ink with a pump, ejecting the ink outside a recording paper sheet, or by a like procedure.

However, in any of these methods, the column of the ink pushed out by the ejection pressure is not entirely changed into liquid droplets in the liquid droplet forming step, and some of the fine ink droplets not ejected will adhere to the periphery of the nozzle. If the ink droplets not ejected fall off spontaneously, or are sucked back into the nozzle, or removed readily, the adverse effects thereof on the ink ejection can be eliminated.

The epoxy resin composition of the present invention can form a coating, which is curable at a relatively low temperature, and is excellent in water- and/or oil-repellency, adhesiveness to a base material, chemical resistance, and abrasion resistance.

Figure 1:
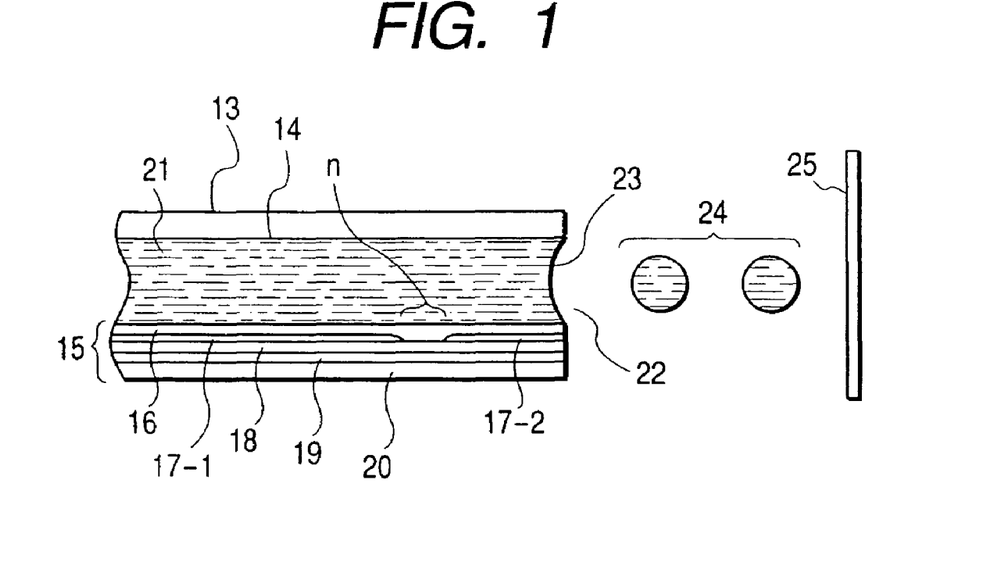
FIG. 1 illustrates a constitution of the main portion of an example of the liquid ejection recording head.
Figure 2:
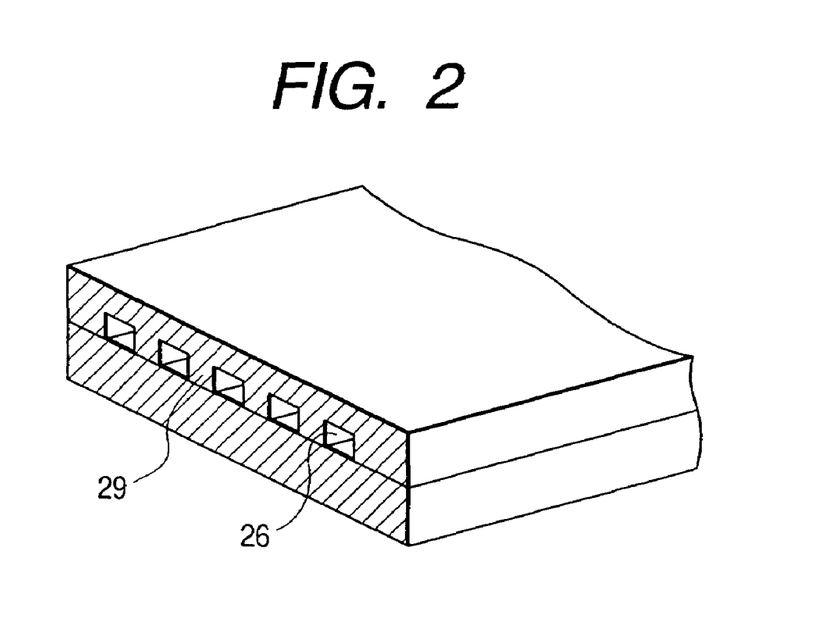
FIG. 2 illustrates an ejection orifice face.

FIGS. 1 and 2 show the main portion of an example of the liquid ejection recording head to which the resin composition of the present invention is applicable. FIG. 1 is a sectional view taken along the ink flow path. FIG. 2 illustrates the ejection orifice face.

The recording head 13 is constructed from a base plate 15, which is equipped with an ejection-energy-generating device and other devices, and a member which is formed from a cured product of a thermosetting resin composition and/or an active energy ray curable resin composition in a prescribed pattern to have at least a flow path and laminated to the base plate.

The base plate 15 is constituted of a base material 20 made from a material with good radiation properties, such as alumina, a heat-accumulating layer 19, a heat-generating resistor layer 18, electrodes 17-1, 17-2 and a protection layer 16 laminated in the named order on the base material. On application of an electric current through the electrode 17-1, 17-2, an ejection-energy-generating element formed at the portion of the heat-generating resistor layer 18 where the electrode is not laminated (the portion in the region denoted by the symbol "n") generates heat and the thermal energy is applied to the ink placed thereon.

In the recording operation, the ink 21 is filled into the ejection orifice (nozzle) 22, which is a fine terminal opening of a groove 14. In this state, the flow of electric current through electrodes 17-1, 17-2 in correspondence with a recording signal generates heat abruptly in the region "n" to produce a bubble in the ink 21 in contact with it by film-boiling, and the ink 21 is ejected in a form of small liquid droplets 24 through the ejection orifice 22 toward a recording medium 25.

In the liquid ejection recording head of the present invention, the cured coating composed of the epoxy resin composition of the present invention is formed as a water- and/or ink-repellant material at least on the periphery of the opening 26 of the ejection orifice of the ejection face 29 (FIG. 2). This prevents the deviation of the direction of liquid droplet ejection caused by adhesion of the liquid droplet on the ejection orifice face. Further, the cured coating composed of the epoxy resin composition of the present invention not only has high adhesiveness to the ejection face 29, but also keeps the water repellency and the adhesiveness, even in the presence of an organic solvent, especially a polar organic solvent in the ink.

Figure 3:
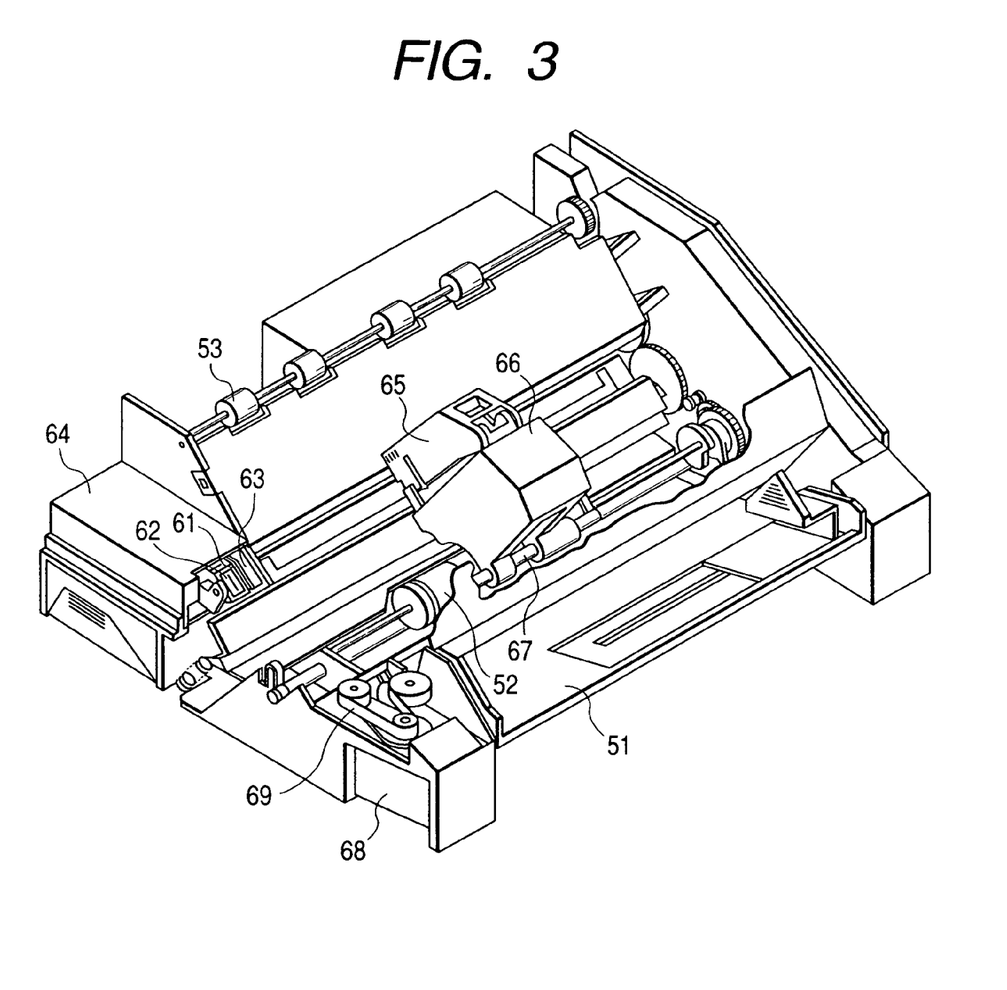
FIG. 3 illustrates an example of a liquid ejection recording apparatus having a multiple head.

FIG. 3 shows an example of the liquid ejection recording apparatus equipped with a multiple head shown in FIG. 2. In FIG. 3, a blade 61 as a wiping member is held at one end thereof by a blade-holding member to be a cantilever. The blade 61 is placed at a position adjacent to the recording region of the recording head, and, in this example, is held to protrude into the moving path of the recording head. A cap 62 is placed at a home position adjacent to the blade 61, and is constituted such that it moves in the direction perpendicular to the moving direction of the recording head to come into contact with the ejection nozzle face to cap the nozzle.

An ink absorbent 63 is placed at a position adjacent to the blade 61, and is held so as to protrude into the moving path of the recording head 65 in a manner similar to that of the blade 61. The blade 61, the cap 62, and the ink absorbent 63 constitute an ejection recovery device 64. The blade 61 and the ink absorbent 63 serve to remove water, dust, and the like from the face of the ink ejection orifice.

A recording head 65 for recording by a liquid ejection system is constituted to eject a liquid, such as ink, by an energy-generating means for the ejection as shown, for example, in FIGS. 1 and 2. A carriage 66 is provided for carrying and moving the recording head 65. The carriage 66 is engaged slidably with a guide rod 67. A portion of the carriage 66 is connected (not shown in the drawing) to a belt 69 driven by a motor 68. Thereby, the carriage 66 is made movable along the guide rod 67 to the recording region of the recording head 65 and the adjacent region thereto.

Through a paper sheet delivery port 51 for insertion of a recording medium, a paper sheet delivery roller 52 driven by a motor (not shown in the drawing) delivers a recording medium. With such a constitution, the recording medium is fed to the position opposing to the ejection nozzle face of the recording head with the progress of the recording, and is discharged through paper-sheet-discharging rollers 53.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejection orifice face of the recording head 65 is wiped. For capping the ejection face of the recording head 65, the cap 62 protrudes toward the moving path of the recording head.

When the recording head 65 is moved from the home position to the record-starting position, the cap 62 and the blade 61 are kept at the same position as in the above-mentioned wiping step to wipe the ejection orifice face of the recording head 65 also in this movement. The recording head is returned to the home position not only at the completion of the recording and at the time of ejection recovery, but is returned also at predetermined intervals during its movement in the recording region for recording to conduct the wiping operation.

Color printing with the ink-jet recording apparatus can be conducted by employing a recording head having ejection orifices for colors of cyan, magenta, yellow, and black in juxtaposition in one recording head, or by employing recording heads independently for the respective colors in juxtaposition. In the color printing, the color inks may be ejected through one common ejection orifice, or may be ejected through separate ejection orifices for the respective colors concurrently to deposit simultaneously two or more colors of the liquid droplets on the recording medium.

The surface of the liquid ejection recording head of the present invention is treated with the ink-repellency treatment material containing the epoxy resin compound of the present invention to have the chemical properties as shown later in the Examples. Therefore, the ink will adhere less thereto, or adhering ink can be readily removed by cleaning with a cleaning wiper blade. Thus, the duration of continuous printing without a disruption is remarkably increased.

Specific examples for the use of the epoxy resin composition of the present invention are shown below. For the curing of a coating of the resin composition of the present invention by an active energy ray, a photocationic catalyst that releases a Lewis acid by light irradiation is added as a catalyst, whereas for the curing of the coating by heating, a Lewis acid, such as boron trifluoride-amine may be added as the catalyst.

Coating Formation Method

For forming a coating, the epoxy resin composition of the present invention is used as a coating liquid in a state of a solution in an organic solvent. A thin coating several μm thick can be formed by applying the coating liquid with a conventional precision-coating apparatus, such as a roll coater, a spin coater, a spray coater, and a die coater (direct coater). In another method, the above coating liquid is applied on a releasing paper sheet to form a dry film, and the dry film is transferred onto a base material surface to stick thereto by means of a laminator or a like apparatus to form a coating on the base material surface.

A first method for treating the base material surface in a pattern is conducted by selective irradiation of the coating with an active energy ray through a mask having a prescribed pattern followed by a development treatment with a developer to remove the uncured portion of the coating. This process is basically similar to a photolithography process. In this process, the developer should be a solvent or a solvent composition for the resin composition of the present invention. The suitable developer includes aromatic solvents, ketones, esters, glycol ethers, and mixtures thereof. The coating is preferably heated, or is irradiated with an active energy ray supplementally after the development for complete curing of the coating.

A second method for treating the base material surface in a pattern is conducted successively through a first step (1) of applying the above coating solution on a base material and drying it to form a coating; a second step (2) of curing the coating by overall irradiation of a polymerization-promoting active energy ray; and a third step (3) of selectively removing the cured film at prescribed portions by irradiation of a degrading active energy ray. A useful polymerization-promoting active energy ray is an ultraviolet ray rich in light having wavelengths of 250 to 480 nm. A useful degrading active energy ray includes light of wavelength of 210 nm or less, and excimer laser ray. In the above second method, also, the coating is preferably subjected in any of the steps to a heat treatment, or to a polymerization-promoting active energy ray irradiation.

As described above, the epoxy resin composition of the present invention is useful as a water-repellency imparting agent or a water-repelling paint for application to a member, which will be brought into contact with a liquid or a substance that impairs the adhesiveness of the water-repellent material, such as polar organic solvents, and is also useful for water- and/or ink-repellency treatment of the ejection orifice face of a liquid ejection recording head.

EXAMPLES

The present invention is described in more detail by reference to Examples and Comparative Examples. The term "%" in the description below is based on mass, unless otherwise mentioned. The examples of the constitution of the composition of the present invention are shown below. The ratios herein mean a mass ratio of solid matter.

Composition Example 1

Resin A1-1:A2-1:Catalyst 1=32:64:4
(used in Example 1 below)

Composition Example 2

Resin A1-1:A2-1:Catalyst 2=47:47:6
(used in Example 2 below)

Composition Example 3

Resin A1-2:A2-1:Catalyst 2=33:65:2
(used in Example 3 below)

Composition Example 4

Resin A1-1:A2-1:C-1:Catalyst 2=35:30:30:5
(used in Example 4 below)
(The symbol "C-1" above denotes a compound of the above General Formula (1) in which p=0, namely, 2,2-bis(4-glycidyloxyphenyl)hexafluoro-propane.)

Examples 1 to 4

The above Composition Examples 1 to 4 were respectively dissolved in a mixed solvent composed of ethylene glycol dimethyl ether and toluene (mass ratio, 1:1) as a solvent to prepare solutions at concentrations of 30 to 40%. The solutions were respectively applied onto silicon wafer base plates having a 5 μm-thick thermally oxidated film in a wet thickness of 1-3 μm by means of a spinner. The base plates were dried on a hot plate at 110° C. for 5 minutes to remove the solvent. The resulting four base plates were respectively irradiated with a UV ray at an integrated dose of 2 J/cm² by means of a UV irradiation apparatus employing a high-pressure mercury-vapor lamp, and then heated in a furnace at 150° C. for 15 minutes to complete the curing. The four base plates were tested as below.

T1: Contact Angle Measurement

The static contact angle of the base plates was measured at an ordinary temperature by using liquids of pure water, an aqueous 10% oleic acid solution, an aqueous 20% glycerin solution, and an aqueous 1% surfactant solution (polyoxyethylene nonylphenyl ether, HLB=10). The measurement was conducted using a contact angle meter (CAX-150, trade name, Kyowa Interface Science Co., Ltd).

T2: Contact Angle (Advanced, and Receding) Measurement after Immersion in Aqueous Dye Solution The base plates having been treated for ink-repellency were respectively immersed in an aqueous 3 mass % solution of water-soluble Direct Black 168 (pH=10.3) at 60° C. for 7 days, and the base plates were washed with pure water and were dried. Then, contact angles of the liquids used in the above measurement of T1 were measured according to the expansion/contraction method using a contact angle meter (CAX-150, trade name, Kyowa Interface Science Co., Ltd).

T3: Long-Term Continuous Printing Test

Figure 4A:
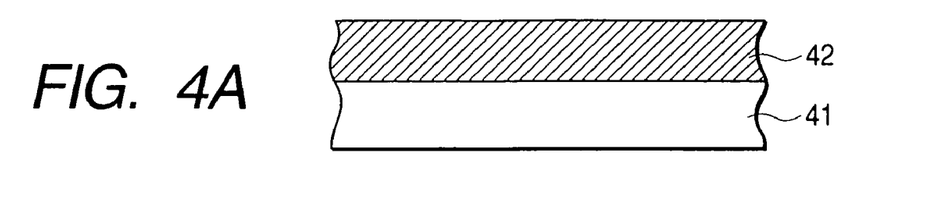
FIGS. 4A, 4B, 4C, 4D and 4E are drawings for explaining the process of the present invention.
Figure 4B:
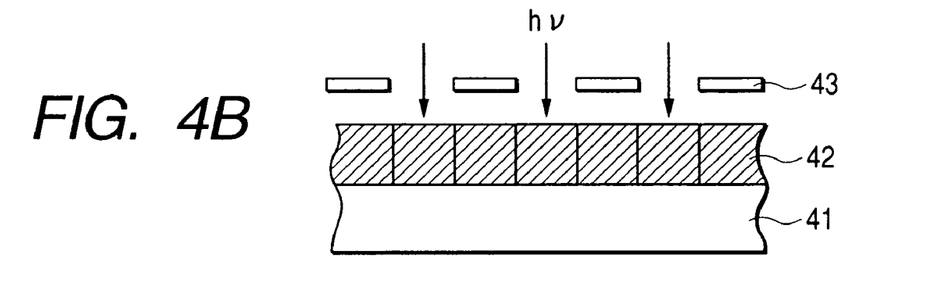
Figure 4C:
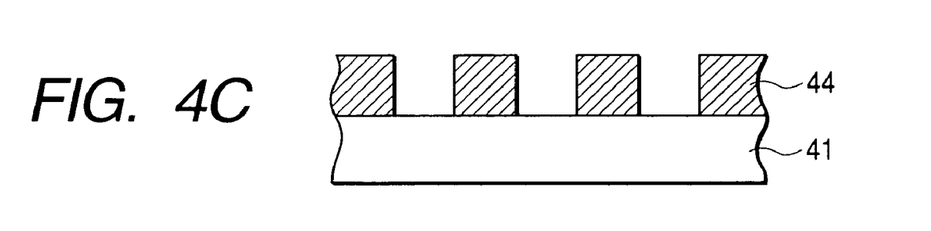
Figure 4D:
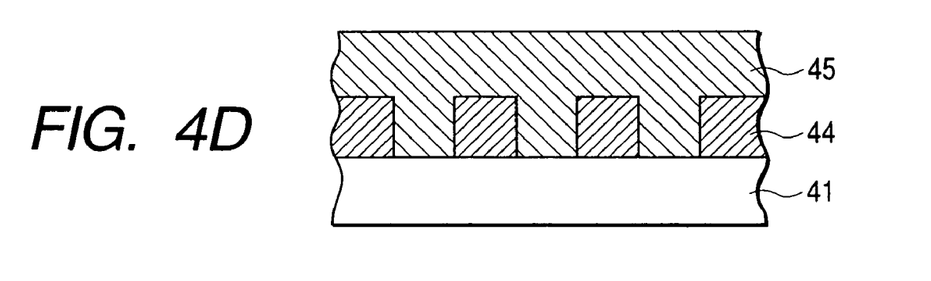

As shown in FIG. 4A, a base plate 41 having elements such as ejection-energy-generating elements (not shown in the drawings) was coated with a positive photoresist (PMER AR-900, trade name, Tokyo Ohka Kogyo Co.) in a coating thickness of 30 μm by spin coating. The coating was prebaked in an oven at 90° C. for 40 minutes to form a resist layer 42. Then, as shown in FIG. 4B, the resist layer was irradiated with an active ray through a prescribed mask 43 to make the irradiated portion soluble in a developing solution. As shown in FIG. 4C, the resist was developed with a prescribed developing solution to leave portions 44 corresponding to the ejection orifices (flow paths) to be formed on the base plate. Then, as shown in FIG. 4D, a flow-path-forming material layer 45 was laminated in a layer thickness of 100 μm, the flow-path-forming material being a mixture of a main ingredient shown in Table 1 and a curing agent (Fujicure FXK, a modified aliphatic amine, Fuji Kasei Kogyo Co.) at a mixing ratio of main ingredient/curing agent=100/50 (mass ratio).

TABLE 1

Constitution of Main Ingredient of Two-Part Epoxy Resin Composition

| Constituents | Mass parts |
| --- | --- |
| Epikote 828 (Yuka-Shell Epoxy Kogyo Co.) | 75 |
| 1,3-Bis(3-glycidoxypropyl)tetramethyl-disiloxane | 25 |
| NUC Silane Coupling Agent A-187 (Nippon Unicar Co.) | 5 |

Figure 4E:
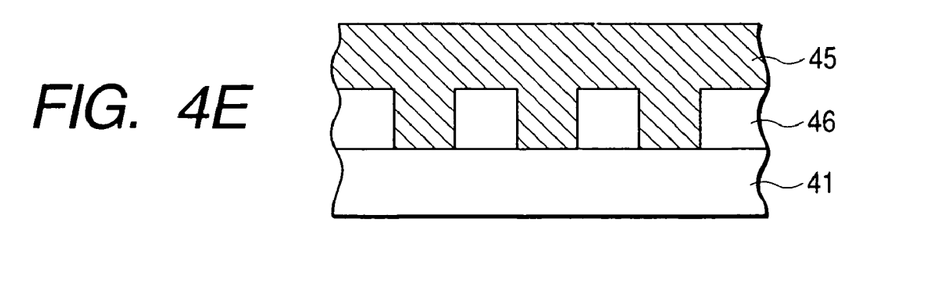

After the lamination of the flow-path-forming material layer 45 (FIG. 4D), the laminated product was left standing at 25° C. for 24 hours, and then cured by heating at 100° C. for 2 hours. The laminated product was immersed in an aqueous 3 mass % sodium hydroxide solution to dissolve and remove the resist pattern 44. The resulting product was washed and dried to obtain a liquid ejection recording head. To the ejection orifice face 46 (FIG. 4E) of the liquid ejection recording heads obtained as above, the epoxy resin compositions of Examples 1 to 4 were respectively applied, and were cured by UV irradiation at a dose of 8 J/cm² and heating at 150° C. for one hour.

On the liquid ejection recording head, electric wiring was formed. This liquid ejection recording head was mounted on a printer and was subjected to a long-term, continuous printing test by use of an ink-jet ink composed of pure water/glycerin/Food Black 2 (water-soluble black dye)/N-methylpyrrolidone=70/15/3/12 (mass ratio).

In the continuous printing test, using 100 sheets of printing paper, patterns for evaluation of printed letters and ink-droplet impact accuracy were printed, and irregularity of the dots in the last printed sample was evaluated based on the evaluation standard described below. The evaluation results are shown under the heading of "T3-1".

Rank A: No irregularity in dot position with good sharpness of characters

Rank B: Slight irregularity in dot position with slight degradation of character quality Rank C: Significant irregularity in dot position with decreased sharpness of characters Rank D: Defects in dots with remarkable degradation in character quality.

The adhesion of the ink on the face of the used printing head was observed and evaluated on the evaluation standard below. The evaluation results are shown under the heading of "T3-2".

Rank A: No or slight ink droplets adhering on nozzle face

Rank B: Small ink droplets adhering on nozzle face

Rank C: Large ink droplets adhering around ejection orifice of nozzle

Table 2 shows the results.

Comparative Example 1

For the surface treatment, Fluorad™ FC-722 (fluoro-coating agent, Sumitomo-3M Co.) was applied to the ejection orifice face in place of the epoxy resin composition employed in Example 1, and was dried at 100° C. for 30 minutes. A base plate was prepared under the curing conditions in the same manner as in Example 1, and was evaluated for the items T1-T3 in the same manner as in Example 1. Table 2 shows the results.

Comparative Example 2

The evaluation for the items T1-T3 was conducted in the same manner as in Example 1, except that Bisphenol AF (the structure shown below) was used in place of the epoxy resin employed in Example 1. Table 2 shows the results.

Structural Formula

Bisphenol AF

TABLE 2

| | T1: Contact angle (°) | | | | T2: Immersion test Contact angle (°) | | T3: Long-term printing test | |
|---|---|---|---|---|---|---|---|---|
| | Pure water | Oleic acid | Glycerin | Surfactant | Advanced | Receding | T3-1 | T3-2 |
| Ex. 1 | 100 | 88 | 100 | 93 | 99 | 90 | A | B |
| Ex. 2 | 105 | 93 | 103 | 90 | 105 | 92 | A | A |
| Ex. 3 | 108 | 97 | 107 | 91 | 108 | 88 | B | A |
| Ex. 4 | 110 | 100 | 109 | 95 | 109 | 93 | A | A |
| CmEx. 1 | 90 | 72 | 90 | 85 | 90 | 74 | C | C |
| CmEx. 2 | 93 | 78 | 93 | 83 | 88 | 73 | C | C |

(Remark) Ex.: Example, CmEx.: Comparative Example

As shown above, the coating formed from the resin composition of the present invention has a large contact angle, and it is maintained for a long time. Even after a long-term contact with ink, the print head surface will not cause ink adhesion, resulting in high dot-impact accuracy and high print quality.

Example 5

Composition Examples 1 and 3 employed in Examples 1 and 3 were respectively applied to polyether sulfone molded plates by a spinner, and dried to obtain a dry thickness of about 2 μm after solvent evaporation. The coated base plates were irradiated using a high-pressure mercury lamp light at a total dose of 10 J/cm² to cure the coating by polymerization. Onto this base plate, an excimer laser beam of wavelength of 195 nm converged to a beam diameter of 5 μm was applied from above the coating to form a nozzle hole. The work for the hole formation was readily conducted without decomposition residue on the edge portion. From the results, the composition of the present invention is particularly suitable for working with a UV laser.

EFFECT OF THE INVENTION

As described above, the present invention provides a resin composition, which is useful as a water-repellency imparting agent or a water-repelling paint for application onto the portions that may be brought into contact with a solution or a material containing a component, which will impair adhesiveness of the water-repellency imparting agent. The present invention provides a resin composition, which is suitable for a surface modification treatment for maintaining the surface condition.

The present invention further provides an ink-jet recording head and a liquid ejection recording apparatus employing the recording head, which has a base plate having been treated with the aforementioned resin composition to keep the nozzle surface unchanged to prevent ink adhesion on the recording head surface even after a long-term contact with an ink, thereby resulting in high dot-impact accuracy and high print quality.

What is claimed is:
1. An epoxy resin composition, comprising:
   (i) a first epoxy resin having a polydispersity ranging from 3.5 to 5.0, wherein the first epoxy resin is represented by formula (A1-1) or (A1-2):

formula (A1-1)

wherein a/b=5/3 and Mn=14,000;

formula (A1-2)

wherein a/d=5/3 and Mn=15,000;

(ii) a second epoxy resin having a polydispersity ranging from 1.5 to 3.0, wherein the second epoxy resin is represented by formula (A2-1):

formula (A2-1)

wherein a/d=3/1 and Mn=4,000; and (iii) a cationic polymerization catalyst.

2. The epoxy resin composition according to claim 1, wherein the epoxy resin composition additionally contains, as a compatibilizer, at least one compound selected from the group consisting of compounds represented by general formulas (1) and (2):

(1)

wherein p is an integer of 0-2;

(2)

wherein q is an integer of 0-2, and

* * * * *